Aug. 20, 1968 J. H. STRASSBURGER 3,397,877
BLAST FURNACE AUTOMATIC CONTROL APPARATUS
Original Filed Oct. 25, 1962
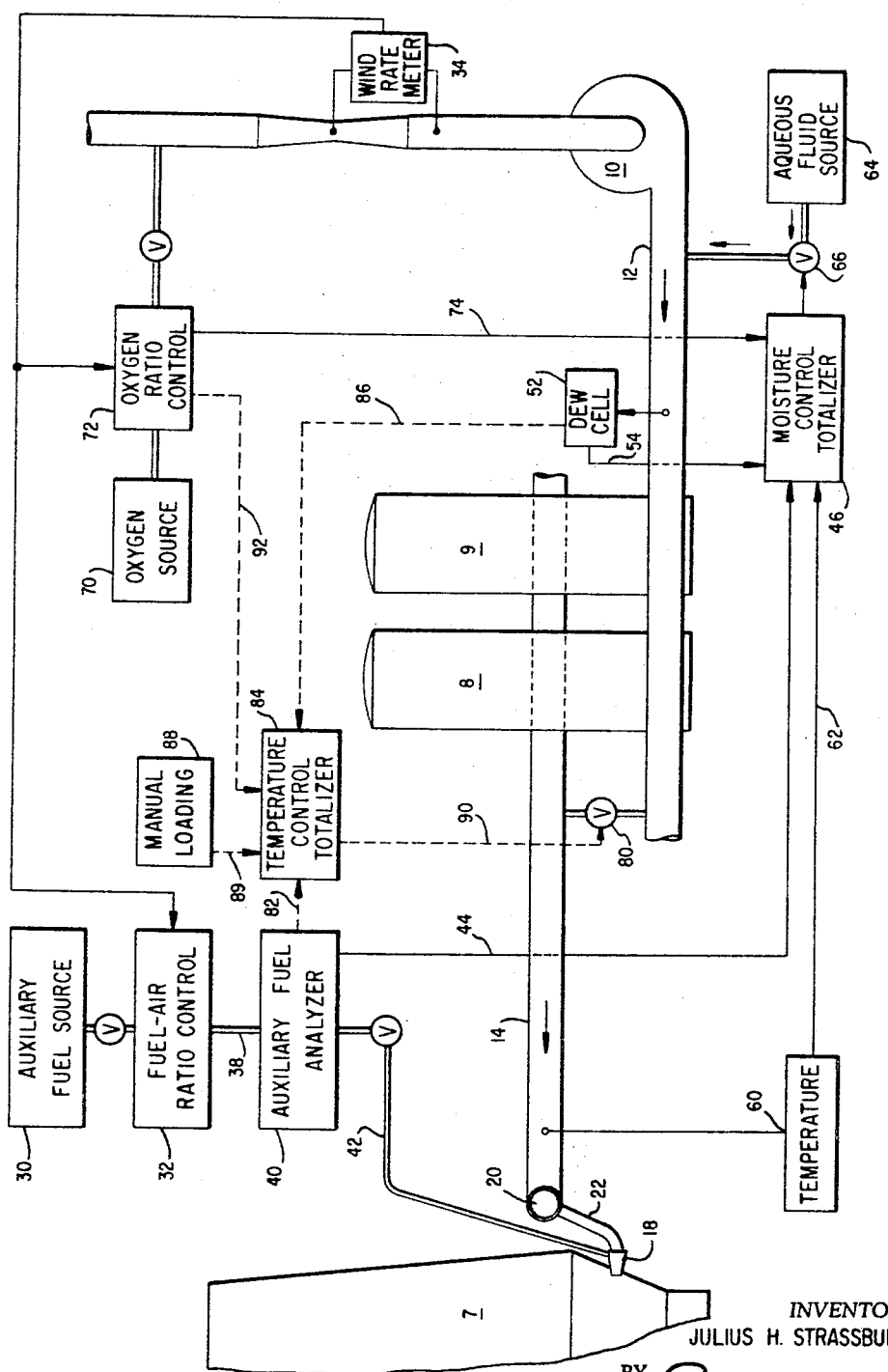
INVENTOR.
JULIUS H. STRASSBURGER
BY Shanley & O'Neil
ATTORNEYS

United States Patent Office 3,397,877
Patented Aug. 20, 1968

3,397,877
BLAST FURNACE AUTOMATIC CONTROL APPARATUS
Julius H. Strassburger, Steubenville, Ohio, assignor to National Steel Corporation, a corporation of Delaware
Original application Oct. 25, 1962, Ser. No. 232,932, now Patent No. 3,346,250, dated Oct. 10, 1967. Divided and this application June 28, 1967, Ser. No. 659,258
2 Claims. (Cl. 266—30)

This application is a division of my application Ser. No. 232,932, filed Oct. 25, 1962, now Patent No. 3,346,250.

This invention is concerned with control apparatus for iron producing blast furnaces.

Conventionally blast furnace coke, iron ore, and slag forming materials are top charged in blast furnace practice and a combustion supporting gas, the blast, is introduced at the bottom of the furnace. As the top charged materials descend against the upward flow of the blast, the iron ore is reduced and molten pig iron is produced. The blast furnace coke performs a number of functions but is primarily responsible for addition of heat and reducing agents to the reaction. It is generally regarded as one of the more expensive items in blast furnace operations.

One objective of the present invention is to economically supplant a portion of normal blast furnace coke requirements with an auxiliary fuel introduced in conjunction with the blast. There are inherent difficulties in this objective since any change in blast furnace additives can disrupt furnace operations, often with expensive, as well as dangerous results. To avoid such difficulties, the invention provides automatic control apparatus which can control aqueous additions to the blast, blast temperature, and auxiliary fuel additions, with or without oxygen enrichment to provide a smooth operating furnace considering both uniform descent of the furnace burden and control of the chemical composition of the hot metal produced.

To provide such automatic control apparatus it is necessary to analyze the interrelation of blast temperature, blast moisture, auxiliary fuel additions, and oxygen enrichment for their individual or combined effect on furnace operations. Earlier teachings by the applicant disclose an interrelation between blast temperature and moisture additions. With the added heat supplied by operating at higher blast temperatures it has been found to be advantageous to effect a heat transfer within the furnace by the controlled addition of aqueous fluid with the blast. In accordance with applicant's teachings, for a furnace to take the increase in heat supplied by an increase in blast temperature of approximately 30° F. it has been found necessary to add about one grain of moisture per cubic foot of blast gas. Such moisture is usually added as steam directly into the blast. Heat absorbed due to dissociation of the added $H_2O$ helps control the temperature in the combustion zone of the furnace. Most of the heat absorbed in the combustion zone of the furnace is recovered in the upper regions of the furnace where the downcoming charge is being heated and reduction initiated. It has been theorized that this transfer of heat within the furnace makes possible an increase in the heat supplied to the furnace via the blast gas without disrupting furnace operations. Because a furnace, under these conditions, is able to take more heat via the blast, the coke requirements are reduced.

Supplanting of blast furnace coke by adding auxiliary fuel with the blast is an aim of the present invention. By conventional thermal analysis of blast furnace operations, adding auxiliary fuel to the blast gas would be termed another way of increasing the heat supplied via the blast gas. The obvious step therefore, since the heat supplied via the blast gas is being increased with the addition of auxiliary fuel, is to increase the moisture additions. The invention departs from these indications of the prior knowledge with its teachings that moisture additions should be decreased and/or blast temperature should be increased in order to make the most effective use of auxiliary fuel additions and maintain smooth furnace operations. These teachings are based on the findings that auxiliary fuels can have the same effect as moisture additions in transferring heat within the furnace. This similarity is believed to be due to the heat required to dissociate the products of combustion of auxiliary fuel and to raise the auxiliary fuel to blast furnace temperature.

The products of combustion of suitable auxiliary fuels can include water and/or carbon dioxide, both of which require heat to dissociate. Also such auxiliary fuels are ordinarily added at a lower temperature than that existing in the blast furnace or at a lower temperature than the blast gas. To make up for this heat deficiency auxiliary fuels have a sensible heat requirement. Therefore for purposes of controlling a furnace, suitable auxiliary fuels can be considered as adding water or its control equivalents, carbon dioxide and a sensible heat requirement, to the blast furnace. The invention teaches therefore, instead of increasing aqueous additions when the auxiliary fuels are added, aqueous additions are reduced in proportion to the amount of water and its control equivalents added by the auxiliary fuel. Considering natural gas as a specific example of an auxiliary fuel, it has been found that when adding 1% by volume of the blast as natural gas, a decrease in aqueous additions of 4 grains per cubic foot of blast gas is required to maintain smooth operational control. Alternatively the blast gas temperature can be increased 110° F. and smooth operations will be maintained. It is to be understood that specific examples recited herein are for a typical commercial furnace and that the specific values may vary depending on furnace characteristics and the type of furnace burden employed.

Auxiliary fuel as used herein refers to gaseous, liquid, and/or solid carbonaceous material; typical examples of suitable auxiliary fuels to be introduced through the blast are natural gas, coke oven gas, blast furnace gas, fuel oil, and pulverized solids, such as coal, common coke, char, etc. in a gaseous or liquid carrier. The amount of coke supplanted by each of these auxiliary fuels will vary slightly with the fuel, for example each pound of pulverized coal will permit a reduction of slightly more than one pound of coke per pound of coal added while each pound of fuel oil will permit a reduction in coke of slightly less than one pound for each pound of fuel oil. The moisture and control equivalents for each fuel, which is a prime consideration in proper functioning of the automatic control apparatus as disclosed herein, can vary more widely. For example, coke oven gas produces 404,000 grains of water per 1000 cubic feet while a like amount of natural gas produces 723,000 grains of water. From the specific thermal values given here in relation to natural gas and other auxiliary fuels, thermal values for most acceptable auxiliary fuels can readily be calculated by those skilled in the art. In describing the invention, the heat required to dissociate the products of combustion of auxiliary fuel and to make up its sensible heat requirements are referred to as the endothermic requirements of the auxiliary fuel.

It is felt that controlling moisture additions lends itself more readily to compensating for the endothermic requirements of auxiliary fuel and maintaining smooth operation of a blast furnace than other types of control. However, blast temperature control is also effective. Blast temperature control may be utilized on blast furnace systems which do not employ moisture addition control or utilized in combination with moisture control when end limits of aqueous fluid additions are reached. As an example of the latter, assume that it is desired to add natural gas at the rate of 5% by volume of the blast gas. Assume also that the furnace is being operated on 23 grains of moisture per cubic foot of blast gas with 16 grains of moisture being aqueous fluid additions and 7 grains being due to atmospheric humidity. With 5% natural gas, a reduction of 20 grains of moisture per cubic foot of gas is indicated (5% natural gas at 4 grains of moisture per percent of natural gas=20 grains of moisture per cubic foot). Since only 16 grains of aqueous fluid are being added to the blast it would be necessary to dehumidify the atmospheric air being used or to reduce the rate of natural gas injection in order to maintain smooth operations. If additional stove heat is available, a more attractive alternative may be increasing the blast temperature. For example 110° F. increase in blast temperature will ordinarily compensate for one percent of natural gas injection. Therefore in place of dehumidifying the cold blast or decreasing natural gas injection, the aqueous additions can be reduced by 16 grains per cubic foot and the blast gas temperature increased 110° F. and smooth operation control will be maintained.

Oxygen enrichment can have an effect on moisture requirements and maintenance of smooth operational control of a blast furnace. As disclosed in applicant's copending application No. 77,507 filed Dec. 22, 1960, when adding oxygen, moisture additions should be increased between 1 and approximately 4 grains for each percent of oxygen enrichment. Therefore, the effect on moisture requirements of oxygen enrichment can be interrelated with the auxiliary fuel additions, aqueous additions, and/or blast temperature to maintain a smooth operating furnace. When properly interrelated, adding oxygen to a furnace being operated on auxiliary fuel additions will cause an increase in the production rate of the furnace which would not be obtainable by merely adding oxygen without considering its moisture requirements.

In further description of the invention reference will be had to the accompanying drawing which schematically illustrates a blast furnace system embodying the invention.

The blast furnace system shown includes a blast furnace 7, blast furnace stoves 8 and 9, and a turbine blower 10. A cold blast main 12 is connected between turbine blower 10 and the blast furnace stoves. A hot blast main 14 is connected between the stoves and a bustle pipe 20. Heated blast is introduced into furnace 7 through tuyere 18 which is connected to bustle pipe 20 by blow pipe 22.

Auxiliary fuel is supplied from source 30. Flow of auxiliary fuel from source 30 is under the control of auxiliary fuel-air ratio control unit 32. This unit in combination with a standard wind rate meter 34, maintains the percentage of auxiliary fuel in the blast gas constant regardless of variations in the wind rate. Auxiliary fuel is delivered through conduit 38 to fuel analyzer 40. A fuel conduit system 42 permits introduction of the auxiliary fuel into the blast furnace system. Preferably auxiliary fuel is introduced directly into the furnace through tuyere 18.

In operation, fuel analyzer 40 measures the auxiliary fuel flow and develops an output signal based on the endothermic requirements of the auxiliary fuel being added. As pointed out earlier this endothermic requirement considers both the products of combustion of the auxiliary fuel and the sensible heat requirements. When operating on moisture control, these endothermic requirements are measured in terms of grains of moisture per cubic foot of blast gas. For example, it has been found that each percent of natural gas added to a furnace is the endothermic equivalent of adding 4 grains of moisture per cubic foot of blast gas. Fuel analyzer 40 can be operated with such preset values for the particular fuel being used or can be operated to analyze the particular fuel, including water content, and determine its endothermic equivalents. The signal generated by fuel analyzer 40 is the same whether based on preset values or determined by the analyzer and is delivered over signal line 44 to moisture control unit 46. As will be considered in more detail later the output signal of fuel analyzer 40 delivered over line 44 acts to decrease aqueous additions to the blast gas.

The automatic control apparatus provided by the invention further considers such items as ambient atmospheric humidity and blast temperature. Dew cell 52 measures the moisture in the cold blast due to atmospheric humidity and develops a signal in grains per cubic foot of blast gas which is delivered to moisture control unit 46 via signal line 54. Temperature response unit 60 measures the hot blast temperature and generates a signal which is converted into grains per cubic foot of blast gas and is equal to the total moisture required at a particular blast gas temperature. This signal is delivered via signal line 62 to moisture control unit 46.

Moisture control unit 46 acts as a totalizer and may be pneumatically operated. As will be obvious to those skilled in the art, in setting up a pneumatic control system each of the measurements must be converted into a pneumatic signal. With signals properly converted, the temperature response unit 60 delivers a signal indicative of the total grains of moisture required at the measured blast temperature. Fuel analyzer 40 would deliver a pneumatic signal in grains per cubic foot based on the endothermic requirements of the auxiliary fuel. Dew cell 52 develops a pneumatic signal equal to the grains per cubic foot of moisture in the blast gas due to ambient atmospheric humidity. The signals from fuel analyzer 40 and dew cell 52 are subtracted from the total moisture requirement signal from temperature response unit 60 and the difference is the output signal of moisture control unit 46.

Aqueous fluid is added to the cold blast from aqueous fluid source 64. Flow of aqueous fluid into the cold blast is under the control of valve 66. The output signal from moisture control unit 46 is fed into control valve 66 and determines the amount of aqueous additions added to the blast.

Table I below indicates the aqueous additions required at various temperatures, with natural gas injection of one percent by volume of the blast gas, without oxygen enrichment, and assuming an atmospheric humidity effect of 6 grains per cubic foot of blast gas.

TABLE I

| Temp., 0° F. | Moisture Required, Grains/ft.$^3$ | Endothermic Equivalent of Natural Gas in grains/ft.$^3$ | Atmospheric Humidity, grains/ft.$^3$ | Aqueous Additions |
| --- | --- | --- | --- | --- |
| 1,500 | 11.7–12.7 | 4 | 6 | 1.7– 2.7 |
| 1,600 | 15.0–16.0 | 4 | 6 | 5.0– 6.0 |
| 1,700 | 18.3–19.3 | 4 | 6 | 8.3– 9.3 |
| 1,800 | 21.6–22.6 | 4 | 6 | 11.6–12.6 |
| 2,000 | 28.2–29.2 | 4 | 6 | 18.2–19.2 |
| 2,200 | 34.8–35.8 | 4 | 6 | 24.8–25.8 |
| 2,400 | 41.4–42.4 | 4 | 6 | 31.4–32.4 |

Similar tables can be developed for other percentages of auxiliary fuel injection by following the formula: total moisture required less endothermic equivalent of auxiliary fuel additions and atmospheric humidity additions equals net aqueous additions required (all measurements in grains per cubic foot of blast gas). For example, the endothermic equivalent of 5% by volume natural gas additions there would be 20 grains of moisture per cubic foot of blast gas and, assuming the atmospheric humidity effect remains at 6 grains per cubic foot of blast gas, the aqueous additions required at 2200° F. would be determined as follows:

34.8 to 35.8 less (20+6)=8.8 to 9.8 grains/ft.$^3$

If 1% oxygen enrichment were employed with the blast furnace of Table I an additional 1–4 grains of aqueous additions would be required. The effect on moisture requirements of oxygen enrichment can be compensated for automatically in accordance with the teachings of the invention. Referring to the drawing, oxygen is supplied from oxygen source 70. Oxygen ratio control unit 72 receives an input from wind rate meter 34 which maintains the percentage of oxygen enrichment constant notwithstanding changes in the wind. Oxygen ratio control unit 72 also develops a signal which is delivered via line 74 to moisture control totalizer 46. This signal, based on oxygen enrichment, is in grains of moisture per cubic foot of blast gas and is added to the total moisture requirement developed by blast temperature sensing unit 60. The moisture requirement for each percent of oxygen enrichment will vary with the temperature at which the furnace is being operated, furnace characteristics, and the furnace burden characteristics. On a typical commercial furnace this will vary between about one and four grains of moisture for each percent of oxygen enrichment.

The invention also teaches use of automatic control apparatus for blast furnace systems which do not have moisture control. For example, a blast furnace installation which has surplus stove heat available but does not have moisture control can utilize its surplus stove heat to compensate for the endothermic requirements of the auxiliary fuel. With natural gas, for example, it has been found that an increase in blast temperature of approximately 110° F. is necessary for each percent of natural gas addition in order to use the natural gas sufficiently and obtain optimum production. In other words, with each percent of natural gas added, the furnace can take an additional 110° of blast furnace heat without hanging and a smooth operating furnace will be maintained. Blast temperature control lines are shown dotted in the drawing; this system would be used separately from the moisture control system but if need be they can be used together by introducing offsetting features to prevent feed-back from the two systems from running both the blast temperature and the moisture additions to their maximums.

Valve 80 controls bypass flow of air between cold blast main 12 and hot blast main 14. With a conventionally operated blast furnace system this valve may be automatically controlled to maintain the hot blast temperature at a preselected level. Blast furnace stoves in such a system ordinarily heat a portion of the blast gas to a temperature above the preselected level and the valve 80 controls the dilution of the hot blast with cold blast to maintain the preselected temperature level.

When operating with auxiliary fuel additions and blast temperature control, auxiliary fuel analyzer 40 produces an output in degrees of blast temperature per unit of auxiliary fuel additions which is delivered over line 82 to temperature control totalizer 84. Dew cell 52 measures moisture in a cold blast due to the atmospheric humidity and delivers a signal in degrees of blast temperature (30° F. for each grain per cubic foot of moisture) over line 86 to temperature converter 84. A manual loading unit 88 may be used to introduce the required blast temperature to maintain smooth operation without auxiliary fuel additions. The mannual loader also permits adjustment for changes in burden which effect the temperature that the blast furnace will take. The signal from manual loader 88 is delivered over line 89 to temperature control totalizer 84. The signals from the auxiliary fuel analyzer 40, dew cell 52, and manual loader 88 are delivered to totalizer 84 which may be pneumatically operated to combine these signals.

For an example of the operation of this blast temperature control system, consider a blast furnace which is operating smoothly at 1400° F. with approximately 4 grains of moisture in the blast gas being due to atmospheric humidity. Assume that the blast furnace installation has surplus stove heat available so that it can operate at approximately 1800° F. Utilizing natural gas as the auxiliary fuel, if natural gas is added from source 30 up to a ratio of about 3% of blast gas auxiliary fuel analyzer 40 will develop a signal delivered over line 82 calling for an increase in blast temperature of 110° for each percent of natural gas. With 3% natural gas being added the temperature requirement will be 330°. Assume also that a change in atmospheric humidity increases the moisture content of the cold blast from 4 grains per cubic foot to 6 grains per cubic foot; the output of dew cell 52 delivered over line 86 would call for an increase in blast temperature of 60°. These signals would be added together in totalizer 84 and a signal delivered over line 90 to valve 80 controlling the by-pass such that the blast temperature would now operate at 1400° F. plus 390° F.=1790° F. The output signal of totalizer 84 would be delivered over line 90 to valve 80. This signal would control the by-pass, in this case diminish the cold blast by-passed to the hot blast, such that the hot blast reaching the furnace is raised 390° F. (330° F. for auxiliary fuel, 60° F. for increased ambient humidity.)

If oxygen enrichment is utilized with blast temperature control, a compensating signal is delivered over line 92 from oxygen ratio control unit 72 to the temperature control totalizer 84. For a typical commercial furnace, the increase in blast temperature required for effective use of each percent of oxygen enrichment can be between about 30° F. and 120° F.

The scope of the invention is defined by the appended claims and not the specific values recited herein for purposes of explaining the invention.

What is claimed is:

1. Blast furnace control apparatus for adding auxiliary fuel to a blast furnace system which includes a blast furnace with tuyere means for introducing a blast gas, stove means for heating the blast gas, and a hot blast main connected between the stove means and the tuyere means comprising
   means for adding auxiliary fuel to the blast furnace contiguous with the blast gas,
   means for measuring auxiliary fuel additions and generating a signal in response to such measurement indicative of the endothermic reqirements of the auxiliary fuel additions, and
   means for controlling the blast gas temperature in accordance with the endothermic requirements of the auxiliary fuel additions.

2. Blast furnace control apparatus for adding auxiliary fuel to a blast furnace system which includes a blast furnace with tuyere means for introducing a blast gas, stove means for heating the blast gas, and a hot blast main connected between the stove means and the tuyere means, comprising
   means for adding auxiliary fuel to the blast furnace contiguous with the blast gas,
   means for measuring auxiliary fuel additions and generating a signal in response to such measurement indicative of the endothermic requirements of the auxiliary fuel additions,
   means for measuring the aqueous content of the blast gas due to atmospheric humidity, and
   means for controlling the blast gas temperature in accordance with the endothermic requirements of the aqueous content of the blast gas due to atmospheric humidity and the auxiliary fuel additions.

References Cited

UNITED STATES PATENTS

| | | | |
|---|---|---|---|
| 2,778,018 | 1/1957 | Strassburger | 266—30 |
| 2,970,901 | 2/1961 | Rice | 266—29 X |
| 2,980,416 | 4/1961 | Strassburger | 266—30 |
| 3,210,181 | 10/1965 | Manny | 266—29 X |

J. SPENCER OVERHOLSER, *Primary Examiner.*

E. MAR, *Assistant Examiner.*